United States Patent [19]

Collins

[11] 4,323,528
[45] Apr. 6, 1982

[54] METHOD AND APPARATUS FOR MAKING LARGE SIZE, LOW DENSITY, ELONGATED THERMOPLASTIC CELLULAR BODIES

[75] Inventor: Frederick H. Collins, Glens Falls, N.Y.

[73] Assignee: Valcour Imprinted Papers, Inc., Glens Falls, N.Y.

[21] Appl. No.: 176,041

[22] Filed: Aug. 7, 1980

[51] Int. Cl.³ .................. B29D 27/00; B29F 3/014
[52] U.S. Cl. .................. 264/53; 264/323; 264/DIG. 66; 425/325; 425/461; 425/817 R
[58] Field of Search .................. 264/51, 53, 323, 539, 264/523, 45.9, DIG. 83, DIG. 66; 425/562, 566, 461, 325, 817 R

[56] References Cited

U.S. PATENT DOCUMENTS

| | | | |
|---|---|---|---|
| Re. 27,484 | 9/1972 | Santelli | 264/539 X |
| 2,515,250 | 7/1950 | McIntire | 264/53 |
| 2,669,751 | 2/1954 | McCurdy et al. | 264/53 |
| 2,744,291 | 5/1956 | Stastny et al. | 264/53 |
| 2,766,480 | 10/1956 | Henning | 264/45.9 |
| 2,835,927 | 5/1958 | Henning | 264/45.9 |
| 2,923,031 | 2/1960 | Collion | 425/566 X |
| 3,162,703 | 12/1964 | Eyles | 264/51 |
| 3,194,854 | 7/1965 | Smith | 264/53 |
| 3,249,660 | 5/1966 | King | 264/51 |
| 3,267,520 | 8/1966 | Ludwig | 425/562 X |
| 3,268,636 | 8/1966 | Angell | 264/51 |
| 3,436,446 | 4/1969 | Angell | 264/51 |
| 3,437,722 | 4/1969 | Cronin et al. | 264/48 |
| 3,558,751 | 1/1971 | Santelli | 264/539 X |
| 3,561,063 | 2/1971 | Sindelar et al. | 425/562 X |
| 3,776,989 | 12/1973 | Annis, Jr. et al. | 264/53 |
| 3,793,416 | 2/1974 | Finkmann et al. | 264/53 |
| 3,814,779 | 6/1974 | Wiley | 264/53 |
| 3,844,699 | 10/1974 | Maxwell | 425/562 X |
| 3,847,526 | 11/1974 | Fries | 425/562 |
| 3,856,904 | 12/1974 | Ayres | 264/53 X |
| 4,077,760 | 3/1978 | Sauer | 425/562 |
| 4,108,956 | 8/1978 | Lee | 425/562 X |

FOREIGN PATENT DOCUMENTS 983224 2/1976 Canada ................ 425/562
2135792 1/1973 Fed. Rep. of Germany ...... 425/562

Primary Examiner—Philip Anderson
Attorney, Agent, or Firm—Fisher, Christen & Sabol

[57] ABSTRACT

Method for producing large size, low density, elongated thermoplastic cellular bodies comprising the steps of forming a mixture of a thermoplastic polymer and a blowing agent dissolved therein under pressure and at a temperature at which the viscosity of the mixture is sufficient to retain the blowing agent when the mixture is allowed to expand, extruding said mixture into a holding zone under conditions that prevent said mixture from foaming, the holding zone having an outlet die orifice opening into a zone of lower pressure and temperature at which said mixture foams and an openable gate closing the die orifice; periodically opening said gate and substantially concurrently applying mechanical pressure by a movable ram on the mixture, preferably while scraping the sides of the holding zone with said ram, to eject the mixture from the holding zone through the die orifice at a rate in excess of that at which substantial foaming in the die orifice occurs and less than that at which substantial irregularities in the cross-sectional area or shape of the cellular body occurs; and permitting the ejected mixture to expand unrestrained in at least one dimension to produce the elongated thermoplastic cellular body. Apparatus for producing elongated thermoplastic cellular bodies comprising an extruder for feeding a mixture of thermoplastic polymer and plasticizing blowing agent at a temperature suitable for producing a cellular body when the mixture is subjected to lower pressure; an expandable holding chamber receiving said mixture from the extruder and maintaining the mixture in a molten state at a pressure above the foaming pressure thereof, ram means for ejecting the mixture out of the chamber; a die having an orifice, preferably in line with the ram means, through which the mixture is ejected by operation of the ram means, and gate means contacting the exterior surface of the die for closing and sealing the die orifice while the holding chamber is being filled.

18 Claims, 3 Drawing Figures

METHOD AND APPARATUS FOR MAKING LARGE SIZE, LOW DENSITY, ELONGATED THERMOPLASTIC CELLULAR BODIES

BACKGROUND OF THE INVENTION

1. Field of the Invention

This invention relates to methods and apparatus for producing foamed thermoplastic, e.g., polystyrene or polyethylene, articles of relatively large thickness and of relatively large lateral cross-section, e.g., 24 square inches or more, and preferably having a density of not more than 4 pounds per cubic foot.

2. Description of the Prior Art

This invention solves a problem that has plagued the production of large-sized structural plastic foam members for almost three decades. "Large-size structural plastic foam members" include plastic foamed boards, planks, panels, beams and the like of substantial dimensions measuring several inches thick and wide and a few to several feet long used primarily for building insulation, cushioning, flotation and sound deadening.

One of the earliest patents concerning large size structural plastic foams in U.S. Pat. No. 2,515,250 which describes the method comprising extruding a foamable gel into a large pressure-resistant vessel (pressurized at 350 psi with normally gaseous blowing agent and air) for 20 to 24 hours to fill it and then emptying the vessel through a discharge valve into a zone of lower pressure, e.g., atmospheric pressure to form a foamed log or beam. This method was soon criticized in U.S. Pat. No. 2,669,751 (by a different inventor of the same assignee) as being "less flexible in operation than is desired for many purposes" and because "during extrusion of the resultant gel the latter tends to cling to inner walls of the vessel and funnel downward so that vapors escape through the bottom discharge valve when a large amount, e.g., one third or more of the gel remains in the vessel." U.S. Pat. No. 2,669,751 further discloses that the use of a storage vessel, or other device, e.g., a heat exchanger, to condition or age a mixture, or body, of a normally gaseous agent and a thermoplastic polymer so as to obtain a homogeneous mobile gel having a uniform temperature throughout its mass, prior to extrusion of the same to form a cellular product, does not allow as great a flexibility in the operation of the process as is desired, particularly with regard to rapidly effecting changes in the composition, or the temperature, of the mixture being expanded to form the cellular product and notes that the operation takes three days to a week to carry out.

As a correction of these problems, U.S. Pat. No. 2,669,751 proposes the production of foamed polystyrene billets or logs having a diameter of 2 to 2.5 inches by extruding a heatplastified mixture of polystyrene and blowing agent and passing it through a mixing and cooling device to lower the temperature into the range of 140° F. to 266° F. before extruding it from the device into an area of lower pressure where foaming takes place. While some of the problems of U.S. Pat. No. 2,515,250 may be corrected by U.S. Pat. No. 2,669,751, new ones arise in that the extrusion of larger billets or logs is difficult in the equipment disclosed.

As pointed out in U.S. Pat. No. 3,817,669, with a given thermoplastic resin such as polystyrene, one can readily extrude a small round foamed rod, such a rod having a diameter of one to two inches of very low density foam. If one attempts to employ the same or similar conditions and proportions of blowing agent, feed, temperatures and the like to extrude a foam body of larger cross-section; for example, a billet twelve inches in thickness and twenty-four inches in width, one can be eminently unsuccessful; the product can warp, twist and distort.

Larger die orifices are needed to make the larger cross-sectional members. The larger die orifices must be supplied with substantially larger quantities of the foamable mixture within a given time period to avoid foaming in the orifice and the resultant bad surface effects. Standard extruders commercially available are not able to supply enough foamable mixture at the appropriate temperature to satisfy the needs of the large die orifice for avoiding foaming in the orifice. While specially designed, giant extruders conceivably can provide an adequate supply of foamable mixture to the die orifice, the capital expenditures, energy requirements and start-up and running complications can seldom, if ever, be justified by local demand. Transportation costs because of increased energy costs render long distance shipment unattractive or impractical.

No prior art is known which teaches the production of large size plastic foam structural members except by the use of a large pressure-resistant vessel as taught by U.S. Pat. Nos. 2,515,250 or 2,774,991 with its attendant problems or the use of excessively large size equipment which can be difficult to operate and uneconomical and which requires considerable local demand for justification.

Injection molding of polystyrene foam is described by Zielinski in an article in the January 1962 issue of Plastics World ("Injection Molding Expandable Polystyrene Beads", pages 18–20). In the Zielinski process, foamable polystyrene beads, which contained pentane as a blowing agent, were injection molded to produce injection molded parts. Densities of the resulting injection molded foamed polystyrene are substantially always at least half the density of the solid polystyrene employed, e.g., 30 or 40 pounds per cubic foot.

Since the Zielinski article, a great deal of activity has occurred in the injection molding of foamed thermoplastic articles. However, because of the need for the molten polymer-blowing agent mixture to flow into the intracacies of the mold the polymer mixture is kept at a high temperature, e.g., 300° F. to 350° F. or higher during extrusion and relatively high density foams result. If, pursuant to this invention, the polymer-blowing agent mixture were held in the accumulator at a temperature of this magnitude and ejected into a zone of atmospheric pressure, foaming would take place inside the die resulting in foamed articles having a very irregular, rough and unsightly surface (moonscape appearance) and structure.

Angell, Jr., U.S. Pat. No. 3,268,636 discloses a form of injection molding wherein a foamable polyethylene or foamable polystyrene is extruded into an accumulator and, when a sufficient quantity has been collected in the accumulator, the foamable thermoplastic therein is injected into a closed mold. This particular Angell patent refers to the production of a relatively thick article but in the Angell system the foamable composition explodes into small particles which fill the mold and fuse together in the mold to form the article. The densities of the resulting Angell foamed article are quite high and the Angell procedure is not capable of producing foamed articles having densities in the vicinity of four pounds per cubic foot or less. Furthermore, the fused particles which constitute the interior of the article are lacking in strength.

In an improvement patent, U.S. Pat. No. 3,436,446, Angell discloses the injection molding of relatively thin walled articles, such as, receptacles, by extruding a foamable thermoplastic material into an accumulator. When a sufficient amount has been collected in the accumulator, the foamable composition is injected into a closed mold to form a thin walled foam product having densities of more than half the density of the solid thermoplastic employed to make the foam, i.e., having densities of 30 or more pounds per cubic foot. While the products are foamed, their densities are 15 or more times greater than the densities of the foamed articles made by the present invention.

King patent, U.S. Pat. No. 3,249,660 discloses the injection of molten, foamable thermoplastic into a mold at a pressure at which the composition will not foam and then mechanically expanding the mold to reduce the pressure and allow the foamable composition to foam and expand into the confines of the mold. The densities of the resulting articles, as in the Angell procedure and apparatus, are very high compared to the foam densities obtained by the present invention.

Eyles patent, U.S. Pat. No. 3,162,703 discloses the injection molding of foamed articles which involves the use of polystyrene beads blended with pentane which are passed through a heating block in which the polystyrene remains a warm or softened solid. After leaving the heating block it is passed as a mobile gel into heated accumulator 26. When a sufficient amount has been collected in the accumulator, it is ejected into a closed mold which is subjected to a vacuum. The foamable composition expands within the mold to contact and be shaped by the walls of the mold. The densities of such articles produced by this process are also quite high because the expansion of the foamable composition must be great enough to force the composition into contact with the mold walls.

Cronin et al, U.S. Pat. No. 3,437,722 discloses the transfer molding of foamed articles wherein the foamed thermoplastic such as polystyrene or polyethylene, is extruded into an accumulator from which it is intermittently ejected into a closed mold.

None of the references mentioned hereinabove disclose or suggest the present invention in which a foamable composition is extruded into a holding zone or accumulator maintained at a temperature and pressure which does not allow the composition to foam and periodically ejecting the composition in the holding zone through a die orifice, at a sufficiently high rate to avoid foaming within said holding zone or die orifice but at not so high a rate that the surface of the resulting cellular body is damaged as a result of melt fracture, into a zone of lower pressure, e.g., atmospheric pressure, or less to allow the rapid expansion, unrestrained in at least one dimension, of said composition to form an elongated thermoplastic cellular body preferably having a density of not greater than about four pounds per cubic foot and a lateral cross-section of not less than 24 square inches.

SUMMARY OF THE INVENTION

This invention relates to a method and apparatus for producing elongated thermoplastic cellular bodies which can be several inches wide or, from less than one inch to several inches thick, and up to several feet long for use in such applications as building insulation purposes, flotation or buoyancy applications, packaging and for such diverse other uses as large art forms, floating pool toys, oil spill flotation containment gear and the like. The present invention provides solutions to the problems described hereinabove in relation to the prior art and provides a relatively low cost means for producing quantities of large size, low density thermoplastic cellular products with a minimum of capital expenditure.

It is therefore a principal object of this invention to provide a method and apparatus for forming low density, large size thermoplastic polymer foams which do not require the use of large pressure-resistant vessels, long filling times, excessively large size equipment, such as giant extruders.

It is another object to provide a method and apparatus for producing large size, low density thermoplastic foams capable of periodic high rates of production such as 5,000 or 10,000 or more pounds per hour of high quality, uniformly dimensioned, unwarped, large size, low density thermoplastic foam.

Another object is to provide a method and apparatus capable of extruding a foamable thermoplastic polymer-blowing agent mixture through a large size die orifice, at a high enough rate to avoid foaming within the die orifice, and at a rate insufficient to result in melt fracture.

It is a further object of this invention to provide means whereby large size, low density thermoplastic polymer foams can be produced having substantially uniform structural characteristics from end to end and free of non-uniform areas which require trimming away waste such as are caused by residual foamable mixture remaining in a pressure-resistant vessel. A further object is the provision of means for providing low density, large size, thermoplastic foams as big and bigger than those produced by the use of pressure-resistant vessels as taught by the prior art or by the use of giant extruders capable of providing high production rates of foamable mixture.

The present invention solves the prior art problems and objects as disclosed hereinabove by providing a method comprising the steps of forming a mixture of a thermoplastic polymer and a blowing agent and cooling the mixture to a temperature at which the viscosity of the mixture is adequate to retain the blowing agent when the mixture is subjected to conditions of lower pressure and allowed to expand. After cooling, the mixture is extruded into a holding zone maintained at a temperature and pressure that prevents foaming of the mixture. The holding zone has an outlet die having an orifice opening into a zone of lower pressure such as atmospheric pressure at which said mixture foams and means for closing said orifice without disturbing the foamable mixture within the holding zone, said means being openable to allow the foamable mixture to be ejected from said holding zone. In addition, a movable ram forces the foamable mixture out of the holding zone through said die orifice at a rate greater than that at which substantial foaming in the die orifice occurs and less than that at which melt fracture occurs, i.e. less than that at which substantial irregularities in cross-sectional area or shape of cellular body being formed occurs. Upon passing through the die orifice into the zone of lower pressure, the foamable mixture is allowed to expand unrestrained in at least one dimension to produce the desired large size, low density thermoplastic foam.

Thermoplastic polymers usable in the present invention include polystyrene, high and low density, polyethylene, polyvinylchloride, and any other thermoplastic polymer suitable for use in manufacturing thermoplastic foams. Such additional polymers are well known in the prior art and are disclosed in the above-mentioned prior art patents and such disclosures are incorporated herein by reference.

Preferable blowing agents are those that provide a plastifying effect on the thermoplastic polymer and include the liquid fluorocarbons, such as, trichloromethane, dichlorodifluoromethane, trifluorochloromethane, difluorotetrachloroethane, dichlorotetrafluoroethane, chlorotrifluoroethane, difluoroethane, butane, pentane, hexane, propane, propylene, butylene, methyl chloride. Preferable blowing agents have an atmospheric boiling point of about $-42°$ C. to about $40°$ C. Mixtures of blowing agents, such as trichlorofluoromethane and dichlorodifluoromethane can be employed. Other blowing agents having a plasticizing effect and an atmospheric boiling point of preferably $-41°$ C. to about $40°$ C. can be employed.

Chemical blowing agents, e.g., diazodicarbonamide, and other azo, N-nitroso, carbonate and sulfonyl hydrazides that decompose when heated and gases, e.g., nitrogen and carbon dioxide, would be suitable by themselves or with other blowing agents in the present invention although the resulting densities are not as low as those obtained with plasticizing blowing agents.

Other additives can be added to the thermoplastic-blowing agent mixture including the well known nucleating agents utilized for the purpose of controlling cell size and cell uniformity. Coloring agents that are well known in the thermoplastic foam arts can also be added, for example, to produce colored foams, such as black foams or the like. Other agents for controlling the size, shape, uniformity and other characteristics of the cell structure can be employed.

In carrying out the method of this invention, the thermoplastic polymer, usually in the form of granules or coarse powder is added to the extruder through the hopper and heated and masticated in the extruder in the usual way to produce a molten mass of thermoplastic being mixed and advanced through the extruder. The temperatures necessary for producing the molten thermoplastic polymer in the extruder are well known and fall in the range of 350° to 400° F., higher or lower, depending upon the particular type of thermoplastic being used. Preferably, at an intermediate point along the extruder the plasticizing blowing agent is pumped into the molten thermoplastic polymer and mixed therewith as the resulting mixture is advanced through the extruder. The plasticizing action of the blowing agent enables the molten mixture of thermoplastic polymer and blowing agent to be cooled as it is forwarded in the forward end of the extruder.

The cooling of the molten mixture of thermoplastic polymer and blowing agent is very important in order to enable the mixture to foam when it is ejected into the zone of lower pressure and to avoid loss of blowing agent and collapse of the cellular structure due to the inability of the molten polymer to retain the blowing agent within the cells formed by the expansion of the blowing agent. If the temperature of the foamable mixture ejected into the lower pressure zone is too high, the thermoplastic polymer portion of the mixture is too fluid, i.e., lacks sufficient viscosity to retain the blowing agent within the mixture or cells formed by expansion of the blowing agent. The optimum temperature range to which the foamable mixture is cooled varies depending upon the type of thermoplastic polymer in the mixture and on other variables such as the type and amount of blowing agent. For example, foamable mixtures containing polystyrene are best cooled to a temperature in the range of about 140° F. to about 275° F., preferably about 230° F. to about 260° F., although higher or lower temperatures can be used. The optimum temperature range for foamable mixtures containing low density polyethylene is about 180° F. to about 250° F., preferably about 215° F. to about 240° F., although higher or lower temperatures can be employed.

The foamable mixture cooled to a temperature, for example, in the preferable range of about 220° F. to about 260° F. is introduced into the holding zone which is maintained at a temperature and pressure which does not allow the foamable mixture to foam. The holding zone is formed with an outlet die having an orifice which opens into a zone of lower pressure, for example, the atmosphere, or opens into a vacuum. The die orifice is externally closable by a gate which is movable externally of the holding zone to open and close the die orifice. The movement of the gate does not, in any way, disturb or otherwise physically affect the foamable mixture within the holding zone. The temperature and thus the viscosity of the foamable mixture does not allow the foamable mixture to readily flow around impediments. The foamable mixture is in such a cool condition and relatively viscous nature that it is difficult if not improbable for it to reweld to itself if a fissure or separation is caused by reason of physical impediments to the flow of the mixture. As a consequence, the flow paths and internal surfaces in the extruder, the holding zone and die orifice should be streamlined to enable the easy flow of the relatively viscous foamable mixture.

It is also desirable to minimize the number of turns to be made by the flow of molten foamable mixture and to minimize the distance of flow thereof from the extruder to the holding chamber and from the holding chamber through the die orifice. Therefore, the extruder should be located as close to the holding chamber as possible consistent with providing a streamlined flow channel from the extruder to the holding chamber and the die orifice should also be located as close to the holding chamber as possible consistent with the provision of streamlined flow of molten foamable mixture from the holding chamber through the die orifice.

The molten foamable mixture can be directed to the holding chamber through a single port located as close to the die orifice as possible or it can be directed to the holding chamber through more than one port located as close to the die orifice as possible. It is preferred to eliminate stagnation of the molten foamable mixture within the holding chamber, i.e., it is preferred to ensure that most, if not all, of the molten foamable mixture is forced out of the holding chamber during each ejection. Quantities of molten foamable mixture that remain in the holding chamber after the ejection and subsequent closing of the die orifice has been found to result in non-uniformities in subsequent cellular bodies formed by subsequent ejections through the die orifice. Such non-uniformities include a slight hooking of the leading end of the subsequent body formed by later ejection and is believed to be due to changes in composition in those portions of molten foamable mixture remaining after the previous ejection and closing of the die orifice. The hooking of the leading end of the body does not effect the advantageous characteristics of the remaining portion of the cellular body and can be trimmed off if found to be undesirable for a particular application. The amount to be trimmed is slight compared with the overall length of the cellular body and may amount to 10% and less of the total length of the body. In many applications the hooked portion is not objectionable and need not be trimmed. The hooked portion, however, can be minimized or eliminated through the proper design of the holding chamber, die and ram and/or through the use of more than one port of entry of the molten foamable mixture from the extruder to the holding chamber so as to minimize or eliminate the amount of molten foamable mixture left in the chamber after ejection.

An important advantage of the present invention is the enablement of using relatively large die openings to produce cell bodies of relatively large cross-sectional area. For example, in regard to polyethylene or polystyrene a one inch diameter round die orifice yields an eight inch diameter cellular body about seven feet long having a density of 1.6 pounds per cubic foot and weighing about four pounds. Such a product is produced at an ejection rate of 5,000 pounds per hour and can also be produced at an ejection rate of about 10,000 pounds per hour in the particular equipment used. The ejection rate of 5,000 pounds per hour is about 2.89 seconds for a four pound capacity holding chamber.

In another example, a round die orifice having a 1.75 inch diameter is capable of yielding a cellular log of about fourteen inches diameter having a density of 1.6 pounds per cubic foot and weight of about eight pounds. The rate in this instance is about 18,000 pounds per hour and the ejection time was 1.6 seconds for the full stroke of the ram in the holding chamber having a capacity of eight pounds. These figures apply to the manufacture of both cellular polystyrene logs as well as cellular polyethylene logs.

The ejection rate, i.e., the time necessary to empty the holding chamber can be varied widely and is dependent upon many factors such as the type of thermoplastic polymer being employed, the type and amount of blowing agent employed, the amount of nucleation, i.e. nucleating agents employed, the presence or absence of other extrusion aiding additives, the temperature of the molten foamable mixture, the pressure under which it is stored in the holding chamber, and the size and configuration of the die orifice. The optimum rate of ejection to produce the desired cellular body having the desired characteristics and size can be readily arrived at for any particular composition of molten foamable mixture and any particular equipment by making a few runs and increasing or decreasing the rate of ejection to produce the desired cellular body. When the rate of ejection is too slow, the molten foamable mixture will foam inside the holding chamber or die orifice resulting in a cellular body having a rough surface and an uneven cellular structure. If the rate of ejection is too high, it causes the phenomenon of melt rupture or melt fracture which is observed as a buckling or warping causing the cross-sectional area and shape of the cellular body to vary along the length of the body rather than having a consistent cross-sectional area and shape substantially from end to end. Melt fracture or rupture, for example, is characterized by alternating peripheral ridges and peripheral valleys along the length of the cellular body. The ridges and valleys generally are observed after the ejection has proceeded for a short period and then become more and more pronounced as the ejection proceeds.

The thermoplastic cellular bodies produced by this invention are of low density, preferably of four pounds per cubic foot or less and more preferably are about 2.2 pounds per cubic foot or less, are about 1.8 pounds per cubic foot or less. The cellular bodies produced by the present invention are of substantially consistent cross-section throughout their lengths. The lengths of such bodies can be varied as desired from a few feet such as 2, 3 or 4 up to many feet, such as 12, 24, 48 or more feet depending upon the size and capacity of the equipment used especially the size of the die opening and the capacity of the holding chamber. In addition, the cellular bodies produced by this invention have a closed cellular structure covered with a thin membrane and having substantially uniform densities, cell size, K-factor and resiliency along the length of the body when such bodies are ejected and are allowed to expand freely.

The cellular bodies produced by this invention can be in the form of cylinders, planks, panels, and can be formed with cross-sections that are circular, flat, rectangular, arched or curved, right angled, square, triangular, S-shaped, T-shaped, X-shaped, or any other desirable shape by selecting a die orifice capable of producing the desired cross-sectional shape. The cellular bodies having a round cross-sectional shape, are highly useful for such applications as flotation bodies for containing oil spills. The round cross-sectional bodies can also be used as components for producing other articles such as pool floats, art forms and the like. Of particular interest as oil spill containment elements and components for producing pool float toys are the polyethylene bodies. In producing art forms and other articles, such as floating pool toys, polyethylene cellular bodies made by the present invention are easily cut with a saw, hot wire or knife especially a serrated knife and welded to itself in the desired shape and form by means of a hot glue gun or a hand operated hot air blower capable of generating sufficiently hot temperatures to soften the polyethylene foam surface sufficiently to enable it to be welded to another polyethylene cellular surface. A wide range of articles can be made in this manner from polyethylene cellular bodies having the above-described cross-sectional shapes or any other cross-sectional shape. The cellular bodies produced by this invention especially in the form of planks, boards, or panels are excellent heat insulating materials and are especially suitable for such purposes in insulating buildings, such as residences, office buildings and the like. The cellular bodies are readily sawed, drilled or cut with a knife and the polyethylene bodies can be readily welded by the application of sufficient heat to melt the surface without substantial cellular collapse and then joining the two surfaces to be welded. Polystyrene cellular bodies can be readily bonded by the use of adhesives.

As disclosed hereinabove, the molten foamable mixture begins to expand as soon as it leaves the die orifice and enters the zone of lower pressure. The cellular body preferably is supported by means of a conveyor system of some type, e.g., conveyor belt, or conveyor rollers, from the time that ejection is begun until ejection is terminated. The ejected foaming molten mixture continues to expand throughout the entire ejection operation which normally takes from less than one second to several seconds and continues to expand even after the ejection operation has been completed. The continued expansion of the cellular body continues for a few to several minutes after ejection is completed indicating the body is still deformable and when it is in an expanding or deformable condition it can be further shaped, for example, by transfer molding or simply by altering one or more of all surfaces of the expanding cellular body. After a period of time the cellular body ceases to expand any further which indicates that cooling has taken place to the extent that the body is no longer totally deformable. Since the cellular body by its nature is a heat insulator, the internal portions remain hot and many remain deformable for a considerable period of time after the outer areas have conjealed and are no longer deformable without the application of more heat.

While the hot cellular body is totally still in deformable condition, it can be shaped by molding, for example, while it is still in the hot deformable condition, the cellular body can be disposed between two mold halves which are brought together to contact the outer surface of the cellular body. Because the cellular body is still expanding, it expands into contact with the mold surfaces which shape the body. As an example, surfing boards, can be produced from a flat or plank shaped cellular body by bringing appropriately shaped mold halves together on the body while the body is still expanding.

Figure 1:
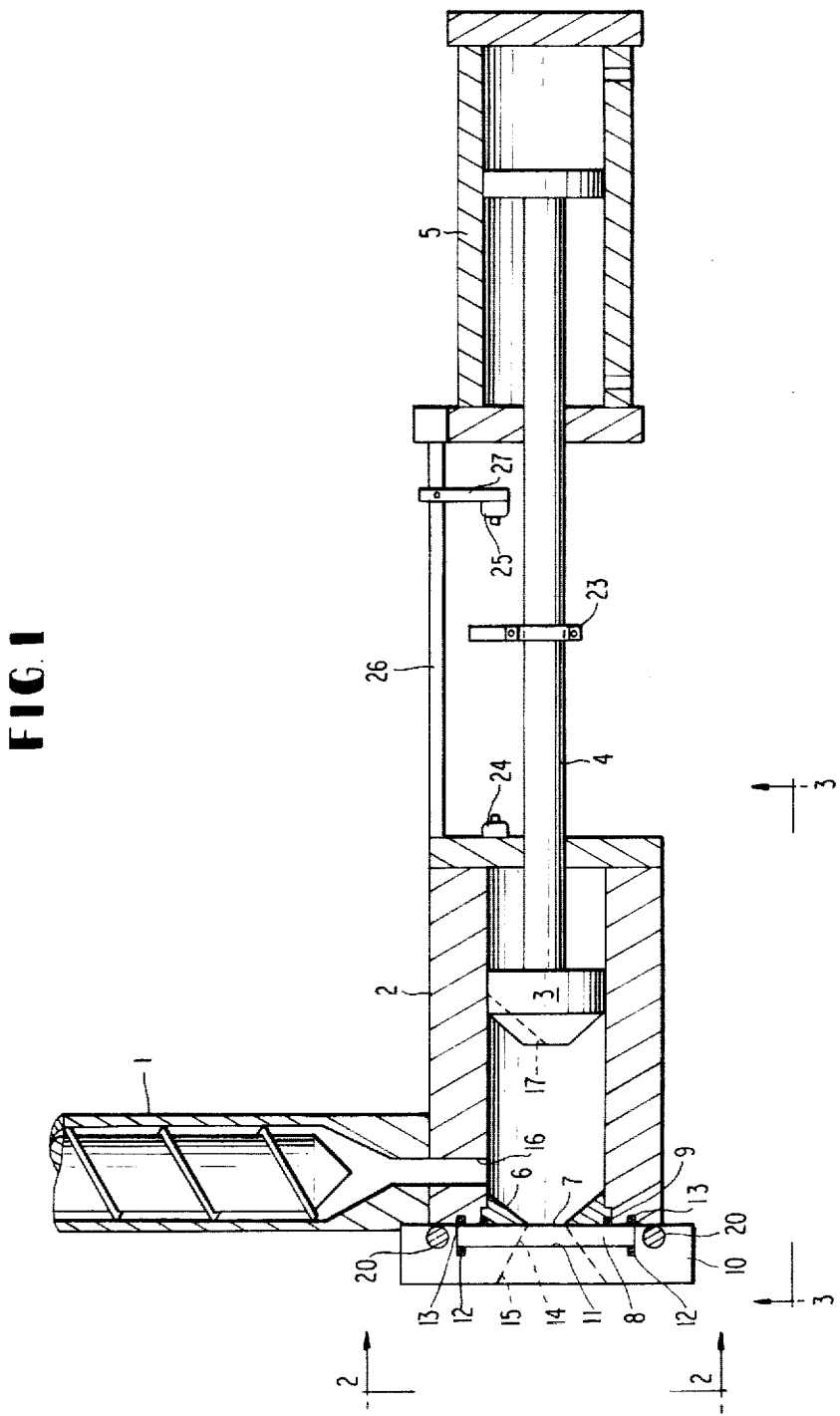
FIG. 1 is a plan view substantially in central cross-section of one embodiment of the apparatus of this invention.

As shown in the figures, an extruder 1 is connected to a holding chamber or accumulator 2 in which is slidably mounted a ram 3 which is connected by piston rod 4 to hydraulic cylinder 5. The holding chamber in the case shown by the figures is cylindrical and the ram 3 is circular having an outside diameter that is only slightly less than the inside diameter of the holding chamber 2 so that the ram 3 can slide back and forth within the holding chamber and scrape any molten foamable mixture clinging to the internal walls of chamber 2. A die 6 having a die orifice 7 is mounted in the end of holding chamber 2. The die 6 is held in place in the forward end of holding chamber 2 by means of sliding gate 8 which bears upon gasket material 9 between said gate and said die orifice. The sliding gate 9 is held in position by face plate 10 which is bolted or otherwise connected to the forward end of holding chamber 2. The face plate 10 is formed with a channel 11 in which the gate 8 slides. Suitable gasketing material 12 is disposed in the channel between the gate 8 and face plate 10. In addition, gasketing material 13 is provided between the gate 8 and the forward end of the holding chamber 2. Such gasketing material can be made of any suitable low friction material capable of withstanding high temperatures to facilitate the sliding of gate 8 in channel 11 of face plate 10 and facilitate the sliding of gate 8 across the front end of holding chamber 2 and die 6.

Figure 3:
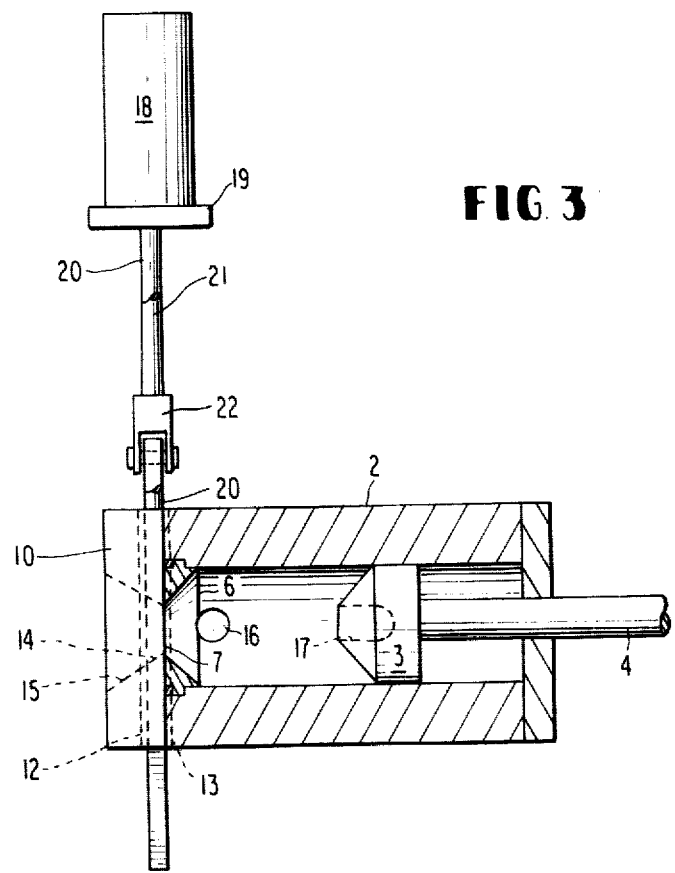
FIG. 3 is a side elevational view partially in central cross-section taken on line 3—3 of FIG. 1.

The gate 8 is formed with an opening 14 that flares outwardly from a circular cross section which is, in this case, about substantially the same size as the die orifice 7. In addition, the face plate 10 is formed with an outwardly flaring opening 15 the inner size and shape of which conforms to the larger dimension of flared opening 14 in gate 8. As best shown in FIGS. 1 and 3, the flared openings 14 and 15 permit the expansion of foamable mixture passing therethrough from the holding chamber 2. The interior surface of the die 6 is also sloped toward the die orifice 7 so as to provide for a streamlined flow of the molten foamable mixture as it is forced to and through orifice 7 by the ram 3. It is also noted in FIGS. 1 and 3 that the extruder outlet 16 from the extruder 1 enters holding chamber 2 as close as possible to the die 6. This is to ensure that as little as possible molten foamable mixture remains in the holding chamber after ram 3 has completed its forward stroke to eject the foamable mixture from holding chamber 2 through orifice 7. In order to permit ram 3 to reach the die 6 and thus squeeze as much foamable mixture out of holding chamber 2 as possible, a groove 17 is formed in the face of ram 3 such that it connects extruder outlet 16 to orifice 7 when ram 3 is in its forwardmost position.

A second hydraulic cylinder 18 is mounted on a platform 19 supported by and above face plate 10 by columns 20. The piston rod 21 of hydraulic cylinder 18 has a yolk 22 mounted on its outer end. The yolk 22 is pivotally connected to gate 8 by means of a pivot pin 23. Thus, when the hydraulic cylinder 18 is operated to move the piston rod upwardly into said cylinder, the gate 8 is sliding upwardly in the channel 11 to close die orifice 7. When the cylinder 18 is operated to move the piston rod downwardly, the gate 8 likewise is moved downwardly to aline the flared opening 14 with die orifice 7 and flared opening 15.

Suitable control means are provided for regulating the extent of rearward movement of ram 3 thereby regulating the amount of molten foamable mixture forced into chamber 2 by extruder 1 through extruder outlet 16. When the ram 3 has reached the rearward extent set for its movement, it is caused to move forwardly by applying oil under pressure behind the piston of hydraulic cylinder 5. At the same time, the second hydraulic cylinder 18 is activated to move the piston rod 21 downwardly to aline the opening 14 of gate 8 with the die orifice 7 and the opening 15 in stationary face plate 10. The molten foamable mixture is forced out of the holding chamber through the orifice 7 and the openings 14 and 15 into the zone of lower pressure, e.g., the atmosphere where it expands and ultimately cools to form a cellular body. It is preferred to support the cellular body as it emits from the holding chamber 2. When ram 3 reaches its forwardmost position, e.g., die 6, and die orifice 7, it trips another switch or sensing device which causes activation of hydraulic cylinder 18 to raise piston rod 21 and gate 8 thereby closing die orifice 7 which also adjusts the pressure on the rear face of the piston in hydraulic cylinder 5 to maintain a pressure within the hydraulic cylinder that will preclude foaming of molten foamable mixture being forced into said chamber by extruder 1. The back pressure, however, exerted by ram 3 on the incoming molten foamable mixture should not be so great that it interferes with the proper operation of extruder 1. When ram 3 reaches its rearwardmost position set for it, the cylinder 5 is again actuated to supply sufficient pressure on the rearward face of the piston thereof to move ram 3 forward and at the same time the second hydraulic cylinder 18 is actuated to lower gate 8 and open orifice 7 to the atmosphere to eject a subsequent cellular body.

FIG. 1 illustrates a system of microswitches for the purpose of opening and closing the gate 8 and controlling the operation of hydraulic cylinder 5. Microswitch actuating arm 23 is fixed to the piston rod 4 to move forwardly and backwardly with the piston rod. A fixed microswitch 24 is mounted forward of actuating arm 23 and initiates closing of gate 8 when arm 23 contacts and actuates said fixed microswitch. In addition, microswitch 24 initiates the lessening of oil pressure on the rearward face of the piston in hydraulic cylinder 5 to enable the ram 3 to move backwardly under pressure from said foamable mixture being introduced into the holding chamber 2 by extruder 1. As mentioned hereinabove the back pressure exerted on ram 3 is predetermined at a level which prevents foaming of the foamable mixture. As the ram 3 moves rearwardly, the microswitch actuating arm does so also. A movable microswitch 25 is mounted on guide rod 26 by means of adjustable bracket 27. When arm 23 contacts microswitch 25 it actuates the microswitch 25 to initiate opening of gate 8 and the introduction of additional oil pressure behind the piston of hydraulic cylinder 5 to move the ram 3 forwardly at a rate which forces the molten foamable mixture through orifice 7 at a sufficient rate to avoid foaming within the orifice or within the holding chamber and not so great as to cause melt rupture. For the production of articles having smaller sizes and weights, the movable microswitch 25 can be moved closer to the accumulator so that the gate 8 is opened and increased oil pressure is applied to the rear face of the piston of hydraulic cylinder 5 at such time when the holding chamber 2 is only partly filled.

EXAMPLE

If desired, the die orifice 7 can be circular and the gate opening 14 can be circular, or the die orifice 7 can be rectangular and the gate opening 14 can be circular, or the die orifice 7 can be dog-bone shaped and the gate opening 14 can be rectangular.

Figure 2:
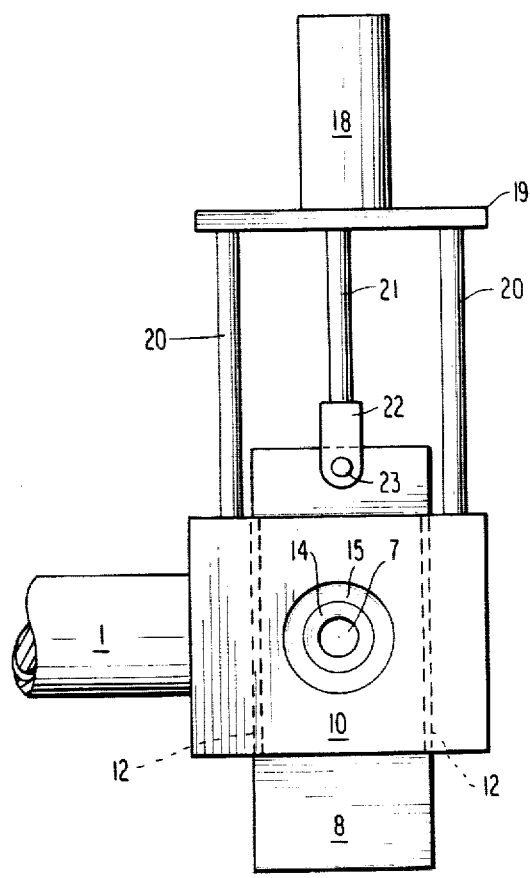
FIG. 2 is a front elevational view taken on line 2—2 of FIG. 1.

The following example is presented to illustrate the invention. This example was carried out in the apparatus shown in FIGS. 1 through 3.

A low density polyethylene resin having a melt index of 2.0 and a density of 0.917 was blended with talc as a nucleator (20 grams talc per 100 pounds of resin) and fed into a 3" extruder 1 having a 48:1 L/D. The mixture was fed through the extruder at a rate of 100 pounds per hour. A mixture of dichlorodifluoromethane and trichlorofluoromethane was pumped into the extruder at an intermediate point at a rate of 15% by weight based on the weight of resin.

The molten mixture was blended until the blowing agent was fully dissolved in the resin. The temperature at this point was 370° F. The admixture was then cooled within the forward portion of the extruder to a melt temperature of 228° F. It was then directed through an adaptor channel to the accumulator 2. The ram 3 of the accumulator 2 was forced back by the pumping pressure of the extruder 1.

The pressure at the end of the extruder screw was 2,000 psi; the pressure within the adaptor channel 16 was 1,500 psi and the pressure within the accumulator 2 was 1,000 psi.

The switch 25 on the accumulator 2 was set to hold 4 pounds of plastic melt. Temperatures of the adaptor channel, accumulator, die 6 and gate 8 were maintained at about 215° F.

When the accumulator was filled, the switch 25 was activated which simultaneously opened the gate 8 and started the accumulator ram 3 forward.

The foamable mixture exited through a 1" diameter round die orifice 7 at a rate of 5,000 pounds per hour. Time of ejection was 2.89 seconds. An 8" diameter cylinder of polyethylene foam was produced 7.15 feet long and had a density of 1.6 pounds per cubic foot. It had an even cell structure and density throughout.

As the ram 3 came totally forward, the switch 24 was activated which closed the gate 8 and the ram's forward movement. Foamable mixture flowing from the extruder 1 pushed the ram 3 backwards to start another cycle.

What is claimed is:

1. In a method for the production of an elongated, thermoplastic cellular body from a foamable mobile gel, that improvement providing low density, elongated cellular bodies of large lateral cross-sectional area comprising: forming a mixture of a thermoplastic polymer and, dissolved therein under pressure, a blowing agent, said mixture having a temperature at which the viscosity of said mixture is sufficient to retain said blowing agent when said mixture is allowed to expand; extruding said mixture into a holding zone maintained at a temperature and pressure which does not allow the resulting mixture to foam, said holding zone having an outlet die defining an orifice opening into a zone of lower pressure at which said mixture foams, and an openable gate closing said die orifice; periodically opening said gate and substantially concurrently applying mechanical pressure by a movable ram on said mixture to eject said mixture from said holding zone through said die orifice into said zone of lower pressure, at a rate greater than that at which substantial foaming in said die orifice occurs and less than that at which substantial irregularities in cross-sectional area or shape occurs; and permitting said ejected mixture to expand unrestrained in at least one dimension to produce an elongated thermoplastic cellular body.

2. Improvement as claimed in claim 1 wherein molding surfaces are caused to bear on said elongated thermoplastic cellular body while it is still deformable and still expanding after ejection to shape said body into a shaped article.

3. Improvement as claimed in claim 1 wherein said elongated thermoplastic cellular body is allowed to freely expand and cool until it is no longer deformable.

4. Improvement as claimed in claim 1 wherein said thermoplastic polymer is polystyrene or polyethylene and said blowing agent contains a hydrocarbon having an atmospheric boiling point of about −42° C. to about 40° C.

5. Improvement as claimed in claim 1 wherein said thermoplastic polymer is polystyrene or polyethylene and said blowing agent is a mixture of trichlorofluoromethane and dichlorodifluoromethane.

6. Improvement as claimed in claim 5 wherein said thermoplastic polymer also contains small amounts of a nucleating agent.

7. Improvement as claimed in claim 1 wherein said rate of ejection is at least 5,000 pounds per hour.

8. Improvement as claimed in claim 1 wherein said rate of ejection is at least 10,000 pounds per hour.

9. Improvement as claimed in claim 1 wherein the temperature in said holding zone is not more than 275° F.

10. Improvement as claimed in claim 1 wherein said elongated thermoplastic cellular body after ejection and full expansion has a density of not more than four pounds per cubic foot and lateral cross-sectional area of not less than twenty-four square inches.

11. Improvement as claimed in claim 1 wherein said die orifice is circular and said elongated thermoplastic cellular body has a circular cross-section.

12. Improvement as claimed in claim 1 wherein said die orifice is dog-bone shaped and said elongated thermoplastic cellular body has a substantially rectangular cross-section.

13. Improvement as claimed in claim 12 wherein said elongated thermoplastic cellular body is molded into the shape of a surfboard while the thermoplastic polymer in said body is in permanently deformable condition.

14. Improvement as claimed in claim 1 wherein said die orifice is circular having a diameter of one inch and said elongated thermoplastic cellular body is cylindrical having a diameter of about eight inches and has a density of about 1.6 pounds per cubic foot.

15. Improvement as claimed in claim 1 wherein said thermoplastic is polystyrene and the temperature of said mixture as it is extruded into said holding zone is about 140° F. to about 275° F.

16. Improvement as claimed in claim 1 wherein said thermoplastic is polyethylene and the temperature of said mixture as it is extruded into said holding zone is about 180° F. to about 250° F.

17. Apparatus for the production of elongated thermoplastic cellular bodies comprising:

(a) an extruder for continuously, uniformly mixing a thermoplastic polymer and a blowing agent and cooling said mixture to a temperature suitable for producing a cellular body when said mixture is subjected to a lower pressure;

(b) mechanically expandable holding chamber in communication with said extruder to receive said mixture from said extruder and to maintain said mixture in a molten state at a pressure above the foaming pressure thereof;

(c) ram means for moving said mixture out of said chamber;

(d) a die having an orifice through which said mixture in said chamber is ejected by operation of said ram means into the atmosphere in which said mixture foams, and (e) gate means in contact with the exterior surface of said die for closing said orifice while said chamber is being filled with said mixture by said extruder and for opening said die orifice to the atmosphere when said mixture is ejected from said chamber by said ram means.

18. Apparatus as claimed in claim 17 wherein said die has a substantially flat exterior surface and said gate means has a flat surface slidable on the flat exterior surface of said die and said gate means has an opening alinable with said die orifice to enable said mixture to pass from said chamber through the orifice and said opening to the atmosphere.

* * * * *